April 14, 1964    J. C. BONGIOVANNI ETAL    3,128,958
EXPANDABLE TENSION REEL
Filed Dec. 21, 1961    2 Sheets-Sheet 1
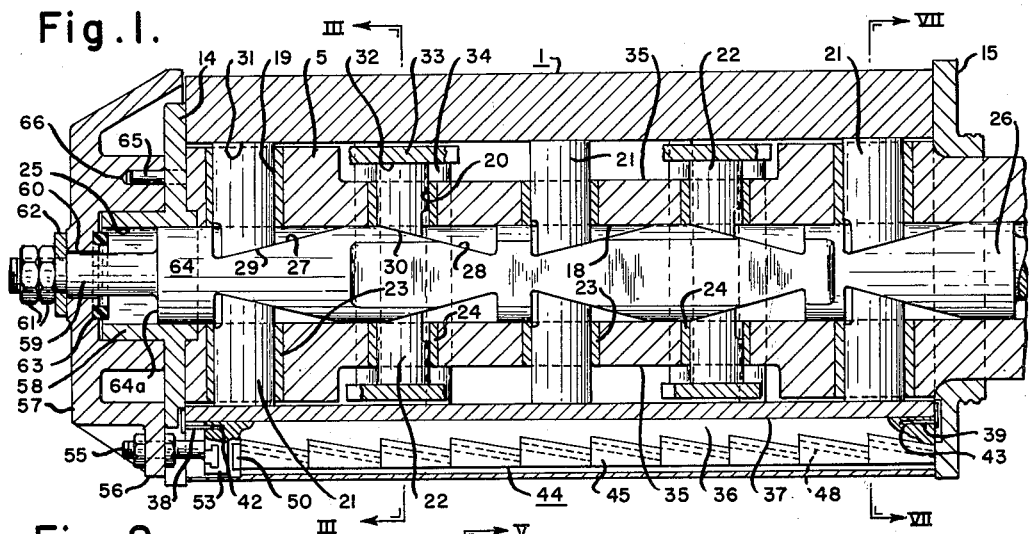
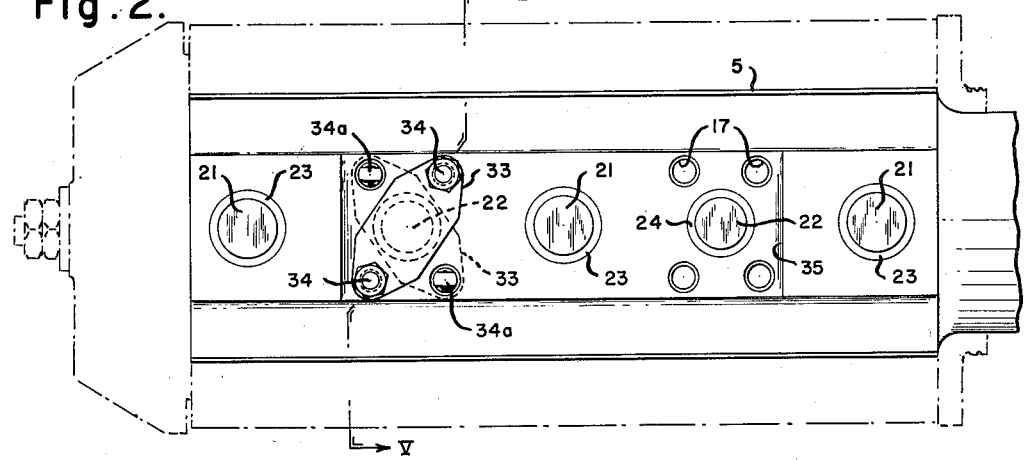
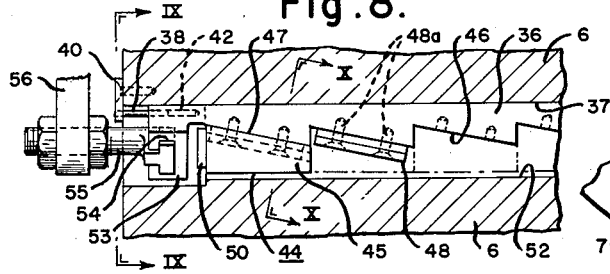
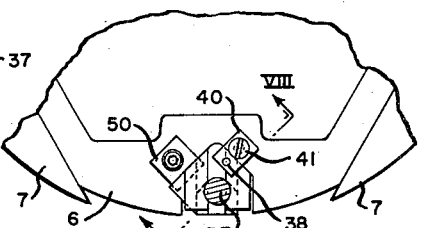
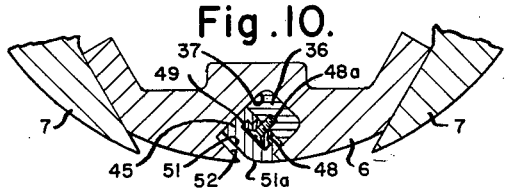
INVENTORS
John C. Bongiovanni,
Harold O. Hill,
Clair T. Whitacre and
Charles H. Anderson, Jr.

April 14, 1964  J. C. BONGIOVANNI ETAL  3,128,958
EXPANDABLE TENSION REEL

Filed Dec. 21, 1961  2 Sheets-Sheet 2

INVENTORS
John C. Bongiovanni,
Harold O. Hill,
Clair T. Whitacre and
Charles H. Anderson, Jr.
By Hooper Leonard & Buell
their attorneys United States Patent Office 3,128,958
Patented Apr. 14, 1964

3,128,958
EXPANDABLE TENSION REEL
John C. Bongiovanni, New Kensington, Harold O. Hill, Leechburg, Clair T. Whitacre, Apollo, and Charles H. Anderson, Jr., Washington, Pa., assignors to Hyde Park Foundry and Machine Company, Hyde Park, Pa.
Filed Dec. 21, 1961, Ser. No. 161,024
12 Claims. (Cl. 242—72.1)

This invention relates to an expandable tension reel for use in winding coils of sheet and strip materials.

Recently, the demand for increasing industrial output has brought about the desirability of increasing the size of coils wound on reels. The coils being several times larger than those generally heretofore wound such as for example, upward of sixty thousand pounds as compared to the twenty to thirty thousand pound coils of general present practice. The weight of such large coils and the tremendous tension of such coils when wound magnify the weaknesses and shortcomings of prior reels.

One of the major problems is that found in reels that leave gaps at various places in their outer periphery particularly in the expanded or working position, such as reels that utilize the familiar hounds tooth joints and reels that use a two-way gripper. These reels all leave gaps in various locations in the outer periphery of the reel that will mark the inner wraps of a coil as it is wound. The aforementioned great weights and tensions so aggravate the problem that these marks extend as much as through one-third of the total number of wraps in the coil. Furthermore, these marks cannot be feasibly removed and generally create scrap problems for the ultimate consumer.

Attempts to overcome this marking have been made such as by employing sleeves which go over the reel and starting the initial wraps of strip material with a belt wrapper. Nevertheless, many reels do not expand concentrically, and since the sleeves are generally slightly smaller than the fully expanded reel and thus do not permit the reel to fully expand, reels that do not expand concentrically are therefore out of balance when used with such sleeves. This unbalanced condition is most undesirable, particularly when rotating the reel at high speeds, because it effects a variation of tensions in the strip and sets up a detrimental jerking or pulsating in the strip as it proceeds along its line of travel.

It has also been observed that many reels do not support the outer contracting and expanding segments uniformly over their full length. This tends to yield a coil that is not uniform in diameter, such as larger at the ends and smaller in the middle, which are difficult to remove from the reel. Furthermore once this tendency begins it swiftly becomes more pronounced until the situation becomes so aggravated as to cause a shut-down for repair or replacement.

Another attendant problem is that many conventional reels rely on springs to contract the reel from its expanded condition. The large coils, however, create such great tensions and strains that deflections in the reel mechanisms result and cause the segments to bind under such pressures that they cannot collapse even with the aid of strong springs. The use of stronger springs is not satisfactory as the heat buildup of the larger coils is so great that in a relatively short time the springs lose their temper and must be replaced. Therefore, the use of springs to collapse a reel is impractical from the standpoint of cost as well as efficiency.

Yet another problem found in conventional reels is lack of sufficient support of the segments. The aforementioned large coils create such severe inward radial forces that ample support of the segments is a necessity, otherwise the segments will collapse from the forces bearing on them or will bind and refuse to collapse which is just as undesirable. For example, some tension reels rely on springs to hold the reel segments in the expanded position. The tremendous pressures involved in the larger coils tend to overcome the spring and the expanded reel will collapse or contract inadvertently and with the heat of the coils lowering the temper of the springs, the eventuality of inadvertent collapsing is almost inevitable.

Still another problem arising from winding large coils is that many reels employ clamping means that rely on springs to open them and again the greater deflections and temper destroying heat caused by the large coils can cause the clamp to freeze or refuse to unclamp. Reels that employ the so-called "two-way" clamps (i.e., clamps that are open on both sides so that a strip end can be clamped for either direction of rotation) and particularly susceptible to freezing due to deflection caused binding because with the "two-way" clamp one side is necessarily left open and therefore, more easily deflected.

It is desirable therefore that a reel have uniformly positively, and adequately supported segments that expand and contract concentrically and have little or no appreciable gaps in their outer periphery in expanded condition to mark the coils wrapped thereon. Moreover, the reel expanding means should have a minimum of binding points therein, the angles of shifting parts being such as will aid in overcoming the tendency of the parts to bind under great pressures, and should use a more positive force for collapsing the reel. Furthermore, the clamping means for clamping the coil ends to the reel for starting the initial wraps of the coil should be as free of binding tendencies as practicable and should also have a more direct positive force for unclamping to avoid the possibility of the clamp freezing in clamping position.

We provide a tension reel comprising an axial rotary reel support means, a plurality of peripheral segments mounted thereon for relative outward and inward movement so as to increase and decrease the effective diameter of the reel, said segments being adapted to present a substantially smooth outer peripheral surface in expanded position, said segments comprising at least a pair of operating segments disposed in opposing relationship to each other separated by a pair of follower segments disposed in opposing relationship to each other, said operating and following segments having cooperating keeper means and keeper receiving means within the outer peripheral surfaces thereof and along their respective adjacent edges in wedge-like relationship whereby as said operating segments are moved inwardly and outwardly with respect to said support means axis said follower segments thereby are correspondingly moved with respect to said axis concentrically with said operating segments.

We further provide means for effecting said relative outward and inward movement of the peripheral segments comprising a plurality of wedge members engaging at least two of said segments and being slidably mounted in said support means for outward and inward movement relative to the axis of said support means, actuator means slidably mounted in said support means for reciprocating movement directed along said axis and having wedge surfaces corresponding to and cooperative with said wedge members whereby a portion of said wedge members is actuated to increase said diameter when said actuator means is moved in one direction and another portion of said wedge members is actuated to decrease said diameter when said actuator means is moved in the other direction and means for moving said actuator means in one direction and then the other.

We further provide that said portion of wedge members for increasing reel diameter be spaced and evenly distributed substantially over the length of the operating segments whereby said segments are substantially evenly supported over their full length by the aforesaid wedge members, and that said wedge members and actuator means provide relatively large wedge areas therebetween to reduce the high bearing pressures encountered which in prior reel caused binding deflections or even collapse of the segments.

We further provide that the wedge members for decreasing said diameter be linked by link means to the operating segments with the actuator means passing therebetween whereby when said actuator means is moved in said other direction the last-mentioned wedge members are moved outwardly relative to said axis and the operating segments thereby pulled inwardly by said link means to decrease the diameter of the reel.

We further provide strip clamping means disposed in one of said segments within and adjacent the outer periphery thereof and in clamping relationship with a portion thereof comprising a wedge bar member slidably mounted in said segments for reciprocating movement directed along the axis of said support means and having a plurality of wedge faces therein, a gripper means adjacent said wedge bar member having wedge faces thereon corresponding to and cooperative with the wedge faces of said wedge bar member, said gripper means being slidably mounted in said segment for lateral movement only relative to said wedge bar member, said wedge bar and gripping means additionally having cooperative key and keyway means therein in slidably wedge-like relationship whereby when said wedge bar member is moved in one direction said gripper means is moved outwardly therefrom to clamping position and when said wedge bar member is moved in the other direction said gripping means is moved inwardly thereto to unclamping position, said wedge bar member being responsively linked to the aforesaid actuator means whereby said wedge bar member is moved in one direction and then the other with said actuator means.

Other details, objects and advantages of the invention will become apparent as the following description of a certain present preferred embodiment thereof proceeds.

In the accompanying drawings, we have shown certain present preferred embodiments of the invention in which FIGURE 1 is a transverse cross-sectional view of an expandable tension reel in collapsed position embodying our invention;

FIGURE 2 is a top plan view in elevation of the mandrel with the movable segments removed;

FIGURE 8 is a fragmentary view of the clamping mechanism shown in FIGURE 1 taken on the line VIII—VIII of FIGURE 9;

FIGURE 9 is a fragmentary elevational view taken on the line IX—IX of FIGURE 8; and FIGURE 10 is a fragmentary view taken on the line X—X of FIGURE 8.

Referring initially to FIGURE 1, we have there illustrated an expandable tension reel embodying our invention having a mandrel 5 to support the reel 1 upon which a coil is to be wound. It will be readily understood that mandrel 5 is in a horizontal attitude and is supported on a stand and mounted thereon for rotation by rotary drive means well known to those skilled in the art and thus not illustrated or further detailed herein.

Figure 3:
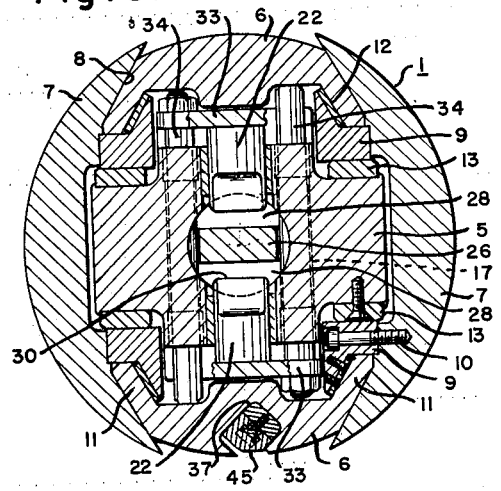
FIGURE 3 is a transverse cross-sectional view taken on the line III—III of FIGURE 1.

Preferably we provide a pair of operating segments 6 and a pair of follower segments 7 mounted on and peripherally surrounding mandrel 5. As shown in FIGURES 3 to 7, segments 6 are disposed in opposing relationship separated by segments 7 also disposed in opposing relationship. Preferably follower segments 7 have keeper receiving slots 8 along their edges. Slots 8 extend along the length of segments 7 within the outer periphery thereof and may be formed integrally in segments 7 or as illustrated in FIGURES 3 to 7 may be formed by the bars 9 secured to the back of segments 7 by appropriate means such as bolts 10. Segments 6, in turn, have keeper portions 11 extending along their edges. Keeper portions 11 extend along the length of segments 6 within the outer periphery thereof and as shown, are an integral part of segments 6 although they obviously could be a separate part fastened thereto. Keeper portions 11 are slidably received in slots 8 in a wedge-like relationship whereby as operating segments 6 are moved either inwardly or outwardly with respect to mandrel 5, segments 7 will correspondingly concentrically move inwardly or outwardly and thereby increase and decrease the diameter of the reel. This corresponding relative movement is clearly illustrated by FIGURES 3 and 4. Wear plates 12 are secured to bars 9 in slots 8 to assure maintenance of a firm slidable fit of keeper portions 11 in slots 8. Similarly, wear plates 13 are secured to mandrel 5 to assure maintenance of a firm slidable fit between segments 7 and mandrel 5. It should be noted further that the angle of the wedge-like relationship between keeper portions 11 and slots 8 is one chosen to aid in avoiding binding due to and deflections that may occur in the segments under load conditions and also, to hold together or interlock the segments on mandrel 5. As illustrated in FIGURE 3, we have found that about 60° from the horizontal is a suitable angle for the aforesaid wedge-like relationship.

The segments are retained lengthwise on mandrel 5 by a retaining plate 14 and rear flange 15 mounted on mandrel 5 as shown in FIGURES 1 and 2.

Figure 4:
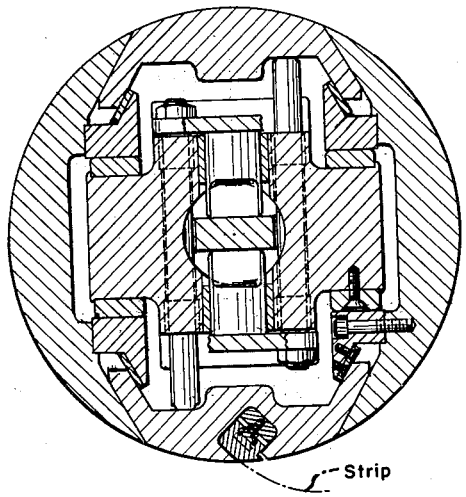
FIGURE 4 is a view similar to FIGURE 3 with the reel in expanded position.
Figure 6:
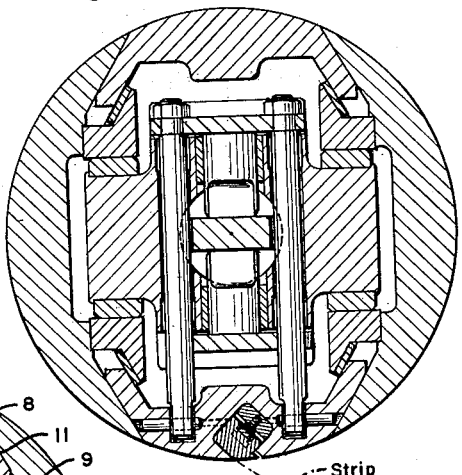
FIGURE 6 is a view similar to FIGURE 5 with the reel in expanded position.
Figure 7:
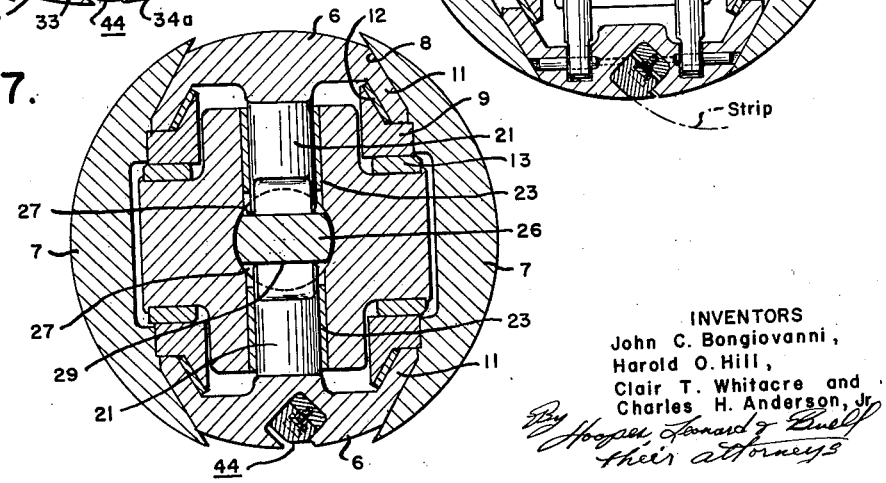
FIGURE 7 is a transverse cross-sectional view taken on line VII—VII of FIGURE 1.

It is clear that when the reel is fully expanded as shown in FIGURES 4 and 6, the outer peripheries of segments 6 and 7 present a substantially smooth, gapless exterior surface and further that the reel segments expand and contract concentrically, all of which substantially prevent the marking of strip both ferrous and non-ferrous wrapped thereon.

Referring now to FIGURE 1, a description of the means of expanding and contracting the reel follows. Mandrel 5 has a series of radial bores 19 and 20 therethrough spaced along its length adjacent operating segments 6. Slidably carried within bores 19 and 20 are cylindrical wedge pins 21 and 22, respectively. Cylindrical wedge pins 21 being the larger and longer wedge pin members relative to the smaller and shorter wedge pin members 22.

Preferably, we provide liners in bores 19 and 20 such as bushings 23 and 24, respectively. Mandrel 5 further has a bore 18 extending lengthwise therethrough coincident with its central axis which intersects and communicates with bores 19 and 20. Retaining plate 14 likewise contains an axial bore 25 therein in alignment with bore 18. An actuator shaft 26 is slidably disposed in bores 18 and 25 for reciprocating movement therein. As clearly shown in FIGURE 1, actuator 26 has wedge faces 27 and 28 thereon which correspond to and cooperate with wedge faces 29 and 30 of cylindrical wedge pins 21 and 22, respectively. It is further clearly there illustrated that as actuator 26 is moved in one direction, for example, to the left as viewed in FIGURE 1, wedge faces 27 and 29 cooperate to move cylindrical wedge pins 21 outwardly in bores 19.

The outer faces 31 of cylindrical wedge pins 21 bear on operating segments 6 adjacent thereto and thus when cylindrical wedge pins 21 are moved outwardly as above described, they in turn force operating segments 6 outwardly which further cause follower segments 7 to move outwardly by virtue of the earlier described wedge-like relationship of keeper portions 11 in keeper retainer slots 8 to thereby concentrically expand the diameter of the tension reel. It is also apparent that when actuator 26 is moved in the other direction, i.e., to the right in the present illustration, corresponding wedge faces 28 and 30 cooperate to move cylindrical wedge pins 22 outwardly in bores 20. The outer faces 32 of cylindrical wedge pins 22 bear on yoke plates 33 which are connected by connecting rod 34 to operating segments 6 (see FIGURES 5 and 6). The ends 34a of rods 34 are secured in segments 6 by appropriate means such as dowel pins 34b.

Figure 5:
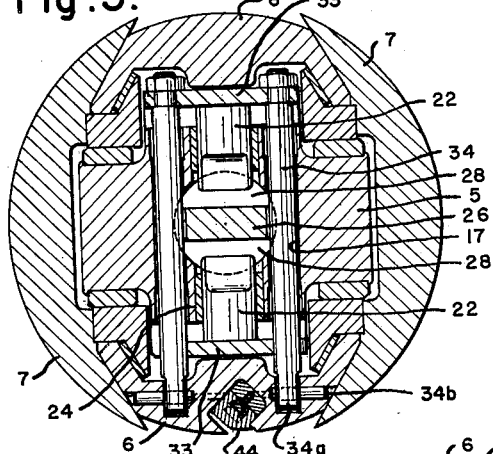
FIGURE 5 is a transverse cross-sectional view taken on the line V—V of FIGURE 2 with the movable segments added in collapsed position.

Referring to FIGURES 5 and 6, it is shown that each yoke plate 33 is respectively connected to the more distant operating segment 6 therefrom by connecting rods 34 passing through appropriate openings 17 therefrom in mandrel 5. Mandrel 5 is additionally countersunk as at references 35 to accommodate the movement of yoke plates 33 therein. As best shown in FIGURE 2, since wedge pins 22 are in opposed pairs their respective yokes 33 are positioned at cross angles to each other to accommodate the connecting rods 34 of each. It is clear therefore that when cylindrical wedge pins 22 are moved outwardly as above described, they in turn move yokes 33 outwardly with the result that connecting rods 34 pull on and move operating segments 6 inwardly which as earlier described causes follower segments 7 likewise to move inwardly and thus collapse or concentrically contract the diameter of the tension reel.

It is also clear in this example that as actuator 26 is moved to the right wedge faces 27 and 29 cooperate to allow the inward moving operating segments 6 to return or push cylindrical wedge pins 21 inwardly into their respective bores 19. Similarly, when actuator 26 is moved to the left, as earlier explained to expand the reel, corresponding wedge faces 28 and 30 cooperate to allow the outwardly moving operating segments 6 through connecting rods 34 to pull yoke plates 33 inwardly and thus return cylindrical wedges 22 back into their respective bores 20.

From the above, it can be understood that the actuator is simply moved in one direction to expand the tension reel and in the other direction to contract it and that both movements apply a positive and direct force to the segments in that the reel is not left to collapse itself with or without the aid of springs but rather is collapsed or contracted by a more positive exertion of force thereon to eliminate the problems attendant prior reels which will not collapse or contract when high tensions and pressures are present and parts are slightly bound by the deflections caused thereby.

It is also clear that both the expansion and contraction of the reel are accomplished concentrically so that the reel is in a balanced condition at all times and is not subject to the earlier discussed undesirable effects of a reel being operated with a sleeve in an unbalanced condition.

It should be further noted in FIGURES 1 and 2 that cylindrical wedge pins 21 and 22 are spaced alternately along the length of the reel so that the segments are evenly and sufficiently supported substantially over their entire length to thus substantially eliminate the earlier discussed problems attendant tension reels having unevenly or insufficiently supported segments.

Additionally, note that wedge pin members 21 are relatively large so as to provide the relatively large wedge faces 29 to cooperate with the relatively large wedge faces 27 of actuator 26 and provide the preferable large wedge areas which reduces the high bearing pressures thereon caused by the large coils on the reel and satisfactorily avoids the problems attendant thereto earlier discussed.

It should also be noted that the wedge angle between wedge faces 27 and 29 and also wedge faces 28 and 30 is about 15 degrees which we have found to be very satisfactory and substantially free of any binding tendencies under heavy load conditions.

It should be further noted that our structure permits the use of a relatively heavy mandrel of large cross section which further aids in reducing binding of parts due to deflection under heavy load conditions.

Suitable means for reciprocating actuator rod 26 are familiar to those skilled in the art and consequently, are not discussed or illustrated herein.

Referring now to FIGURES 1, and 8 to 10, we shall describe a means for clamping the ends of strip material to our tension reel to begin the initial wraps of material thereon. The clamping means as illustrated is disposed in one of operating segments 6, however, it could just as well be in any of the segments 6 or 7. The clamping means is preferably disposed within the outer periphery and along the full length of the segment according to the following description. A wedge bar 36 is slidably disposed for reciprocating longitudinal movement along the direction of the axis of the reel in the cavity 37 formed in the segment. Wedge bar 36 is restrained from transverse movement therein by guide pins 38 and 39 in guide holes 42 and 43, respectively, in wedge bar 36. Guide pins 38 and 39 are carried by plates 40 secured to segment 6 at each end thereof by appropriate means such as screws 41, as best shown in FIGURE 9.

The gripper means 44 is comprised of a series of wedge blocks 45 in juxtaposition with wedge bar 36 in cavity 37 and is slidable only in a direction perpendicular to wedge bar 36. Wedge bar 36 and wedge blocks 45 have correspondingly cooperative wedge faces 46 and 47, respectively. Wedge bar 36 has a number of T-headed segments or keys 48 secured to its wedge faces 46 by appropriate means such as screws 48a and wedge blocks 45 have T-shaped troughs or keyways 49 formed in their wedge faces 47 into which the T-heads of segments 48 are slidably disposed to form a key slidable in a keyway arrangement therebetween.

Gripper means 44 is prevented from shifting longitudinally with wedge bar 36 by retaining plate 50 secured to segment 6 at one end thereof and flange 15 at the other end thereof. It can readily be understood that as wedge bar 36 is moved in one direction and then the other, that gripper means 44 will be caused to move inwardly and outwardly from wedge bar 36 by virtue of the cooperating wedge faces 46 and 47 and keys 48 in keyways 49. Thus, for example, as illustrated in FIGURE 1, when wedge bar 36 is moved to the left the wedge faces 46 and 47 cooperate to move gripper means 44 outwardly from wedge bar 36 and conversely when wedge bar 36 is moved in the other direction or to the right in FIGURE 1, gripper means 44 is pulled inwardly toward wedge bar 36 by virtue of the wedge-like relationship of keys 48 in keyways 49. It is obvious, of course, that other keys in keyway arrangements could be used therebetween within the scope of our invention.

Referring now to FIGURE 10, it should be noted that the clamping faces 51 of wedge blocks 45 cooperate with a corresponding face portion 52 in cavity 37 of the segment 6 to clamp the ends of a strip preparatory to making the initial wraps of the coil on the reel. Thus, as above exemplified when wedge bar 36 is shifted to the left, gripper means 44 is moved outwardly therefrom toward face portion 52 which with clamping faces 51 cooperate to grip the strip end until wedge bar 36 is shifted to the right whereupon gripper means 44 is moved inwardly toward wedge bar 36 and away from face portion 52 to free the coil end. Again note that this more positive movement in both clamping and unclamping directions eliminates any possible freezing of the clamp due to deflection caused binding of parts under heavy load conditions.

It should also be noted that in keeping with the presentation of a smooth exterior surface by the segments in expanded position that faces 51a of wedge blocks 45 which form a portion of the outer periphery of the segment is curved to conform with said outer periphery and is slightly recessed within the outer periphery of the segment in unclamping position so that when gripper means 44 is moved to clamping position with the coil and inserted between faces 51 and 52, face 51a will be substantially aligned with the peripheral surface of the segment.

A description of a preferred means of reciprocating or moving wedge bar 36 in one direction and then the other is as follows. Wedge bar 36 has an enlarged end portion 53 which has a T-shaped slot or channel 54 in the outer face thereof. The head of a T-shaped bolt 55 is slidably disposed in channel 54 and bolt 55 is secured in the adjacent peripheral portion 56 of an end plate or bell 57 which in turn is slidably mounted on the flange 58 of retainer plate 14 as shown in FIGURE 1. The reduced end portion 59 of actuator shaft 26 passes through a central opening 60 in bell 57 and nuts 61 and washer 62 are carried on the threaded end thereof. Bell 57 has a bumper ring 63 of rubber or other suitably compressible resilient material mounted in the inner face thereof adjacent central opening 60.

As shown in FIGURE 1, it is clear that as actuator shaft 26 is shifted to the left to expand the reel, reduced end portion 59 thereof passes through opening 60 and the unreduced portion 64 of actuator 26 slidably moves within bore 25 of retainer plate 14 until the end face 64a of portion 64 engages bumper 63. When this occurs bell 57 is moved outwardly with actuator 26 and the bolt 55 carried by bell 57 thereupon pulls wedge bar 36 to the left to close the clamping means as earlier described. It should be noted that the compressibility of bumper 63 allows a desirable working range for strip coil thickness.

It is equally clear from FIGURE 1 that in opening the clamp, actuator 26 is shifting to the right and the reel is contracting and reduced end portion 59 slides through opening 60 until washer 62 strikes bell 57 whereupon bell 57 is slidably returned to its initial position. As bell 57 is moved to the right, bolt 55 pushes wedge bar 36 to the right releasing the coil end as earlier described.

It should be noted that the slidable T-head bolt 55 in the channel 54 of wedge bar 36 accommodates the inward and outward movement of the segment as the reel expands and contracts.

We further provide a pin 65 secured to retainer plate 14, the body of which is slidably received in an opening 66 in bell 57 and prevents any possibility of bell 57's rotating and thus prevents any possibility of binding bolt 55 in channel 54.

It can be understood that the clamping of the coil end occurs at the end of the expansion cycle of the segments and the unclamping of the coil end occurs at the end of the contraction cycle of the segments and that both the clamping and unclamping operation are executed by direct positive forces that insure the accomplishment of each.

Thus, we have invented a tension reel that is capable of winding coils of far greater size than ordinary reels that is highly deflection resistant and is balanced and substantially free of binding tendencies and will not inadvertently collapse or fail to collapse when so desired. The savings to be gained in productivity and trouble free operation will be apparent to those skilled in the art.

While we have described and illustrated a presently preferred embodiment of the invention, it is to be distinctly understood that the invention is not limited thereto but may be otherwise variously embodied within the scope of the following claims.

We claim:

1. A tension reel for strip material comprising an axial rotary reel support means, a plurality of peripheral segments mounted thereon for relative outward and inward movement so as to increase and decrease the effective diameter of the reel, means for effecting said relative movement comprising a plurality of wedge members engaging at least one of said segments and being slidably mounted in said support means for outward and inward movement relative to the axis of said support means, actuator means slidably mounted in said support means for reciprocating movement directed along said axis and having wedge surfaces corresponding to and cooperative with said wedge members whereby some of said wedge members are actuated to increase said diameter when said actuator means is moved in one direction and other of said wedge members are actuated to decrease said diameter when said actuater means is moved in the other direction.

2. A tension reel for strip material comprising an axial rotary reel support means, a plurality of peripheral segments mounted thereon for relative outward and inward movement so as to increase and decrease the effective diameter of the reel, means for effecting said relative movement comprising a plurality of fedge members engaging at least two of said segments and being slidably mounted in said support means for outward and inward movement relative to the axis of said support means, a number of said wedge members cooperating with said last-mentioned segments for outward movement thereof and a number of other of said wedge members cooperating with said last-mentioned segments for inward movement thereof, actuator means slidably mounted in said support means for reciprocating movement directed along said axis and having wedge surfaces corresponding to and cooperative with said wedge members whereby said first-mentioned number of wedge members are actuated to increase said diameter when said actuator means is moved in one direction and said second-mentioned number of wedge members are actuated to decrease said diameter when said actuator means is moved in the other direction.

3. A tension reel for strip material comprising an axial rotary reel support means, a plurality of peripheral segments mounted thereon for relative outward and inward movement so as to increase and decrease the effective diameter of the reel, means for effecting said relative movement comprising a plurality of wedge members engaging at least two opposing segments and being slidably mounted in said support means for outward and inward movement relative to the axis of said support means, actuator means slidably mounted in said support means for reciprocating movement directed along said axis and having wedge surfaces corresponding to and cooperative with said wedge members whereby a number of said wedge members are actuated to increase said diameter when said actuator means is moved in one direction and a number of other of said wedge members are actuated to decrease said diameter when said actuator means is moved in the other direction, said first-mentioned number of wedge members being longer than said second-mentioned number and pushing said segments outwardly when actuated by said actuator means, link means connecting the shorter wedge members with said segments, said actuator means passing intermediate said shorter wedge members and their respective linked segments whereby when said portion of shorter wedge members is moved outwardly by said actuator means said segments are pulled inwardly by said link means to decrease the diameter of the reel.

4. A tension reel for strip material comprising an axial rotary reel support means, a plurality of peripheral segments mounted thereon for relative outward and inward movement so as to increase and decrease the effective diameter of the reel, means for effecting said relative movement comprising a plurality of spaced independent wedge members slidably mounted in the support means for perpendicular movement relative to the axis of the support means, some of said wedge members being longer and cooperating with at least two opposing segments for outward movement thereof to increase said reel diameter and other of said wedge members being shorter and cooperatively linked with at least two opposing segments for inward movement thereof to decrease said reel diameter, actuator means slidably mounted in the support means for reciprocating movement directed along said axis and having wedge surfaces corresponding to and cooperative with the wedge members and passing intermediate said shorter wedge members and their respective linked segments whereby when said actuator means is moved in one direction said longer wedge members are moved outwardly and correspondingly move said segments outwardly thereby increasing the reel diameter and when said actuator means is moved in the other direction said shorter wedge members are moved outwardly and correspondingly pull said segments inwardly by virtue of being linked thereto thereby decreasing the reel diameter.

5. A tension reel for strip material comprising an axial rotary reel support means, a plurality of peripheral segments mounted thereon for relative outward and inward movement so as to increase and decrease the effective diameter of the reel, said segments being adapted to present a substantially smooth outer peripheral surface in expanded position, said segments comprising a pair of operating segments disposed in opposing relationship to each other separated by a pair of follower segments disposed in opposing relationship to each other, said operating and follower segments having cooperating keeper means and keeper receiving means within the outer peripheral surfaces thereof and along their respective adjacent edges in wedge-like relationship whereby as said operating segments are moved inwardly and outwardly with respect to the axis of said support means said follower segments thereby are correspondingly moved with respect to said axis, and means for effecting said relative movement.

6. A tension reel for strip material comprising an axial rotary reel support means, a plurality of peripheral segments mounted thereon for relative outward and inward movement so as to increase and decrease the effective diameter of the reel, said segments being adapted to present a substantially smooth outer peripheral surface in expanded position, said segments comprising a pair of operating segments disposed in opposing relationship to each other separated by a pair of follower segments disposed in opposing relationship to each other, said follower segments having keeper receiving means along the edges and within the outer peripheral surface thereof adjacent the operating segments and said operating segments having keeper means along their respective adjacent edges slidably disposed in said keeper receiving means in wedge-like relationship therewith whereby as said operating segments are moved inwardly and outwardly with respect to the axis of said support means said follower segments thereby are correspondingly moved with respect to said axis, and means for effecting said relative movement.

7. A tension reel for strip material comprising an axial rotary reel support means, a plurality of peripheral segments mounted thereon for relative outward and inward movement so as to increase and decrease the effective diameter of the reel, said segments being adapted to present a substantially smooth outer peripheral surface in expanded position, said segments comprising a pair of operating segments disposed in opposing relationship to each other separated by a pair of follower segments disposed in opposing relationship to each other, said follower segments having wedge receiving means within the outer peripheral surface thereof along the edges adjacent the operating segments and said operating segments having wedge elements within the outer peripheral surface thereof along their respective edges adjacent the follower segments slidably disposed in said wedge receiving means in wedge-like relationship therewith whereby as said operating segments are moved inwardly and outwardly with respect to the axis of said support means said follower segments thereby are correspondingly moved with respect to said axis in a direction perpendicular to the direction of movement of said operating segments, and means for effecting said relative movement.

8. A tension reel for strip material comprising an axial rotary reel support means, a plurality of peripheral segments mounted thereon for relative outward and inward movement so as to increase and decrease the effective diameter of the reel, said segments being adapted to present a substantially smooth outer peripheral surface in expanded position, said segments comprising at least a pair of operating segments disposed in opposing relationship to each other separated by a pair of follower segments disposed in opposing relationship to each other, said operating and follower segments having cooperating keeper means and keeper receiving means within the outer peripheral surfaces thereof and along their respective adjacent edges in wedge-like relationship whereby as said operating segments are moved inwardly and outwardly with respect to the axis of said support means said follower segments thereby are correspondingly moved with respect to said axis, means for effecting said relative movement comprising a plurality of wedge members engaging said operating segments and being slidably mounted in said support means for inward and outward movement relative to the axis of said support means, actuator means slidably mounted in said support means for reciprocating movement directed along said axis and having wedge surfaces corresponding to and cooperative with said wedge members whereby some of said wedge members are actuated to increase said diameter when said actuator means is moved in one direction and other of said wedge members are actuated to decrease said diameter when said actuator means is moved in the other direction.

9. A tension reel for strip material comprising an axial rotary reel support means, a plurality of peripheral segments mounted thereon for relative outward and inward movement so as to increase and decrease the effective diameter of the reel, said segments being adapted to present a substantially smooth outer peripheral surface in expanded position, said segments comprising at least a pair of operating segments disposed in opposing relationship to each other separated by a pair of follower segments disposed in opposing relationship to each other, said follower segments having wedge receiving means within the outer peripheral surface thereof along the edges adjacent the operating segments and said operating segments having wedge elements along their respective edges slidably disposed in said wedge receiving means in wedge-like relationship therewith whereby as said operating segments are moved inwardly and outwardly with respect to the axis of said support means said follower segments thereby are correspondingly moved with respect to said axis in a direction perpendicular to the direction of movement of said operating segments, means for effecting said relative movement comprising a plurality of wedge members engaging said operative segments and being slidably mounted in said support means for inward and outward movement relative to the axis of said support means, actuator means slidably mounted in said support means for reciprocal movement directed along said axis and having wedge surfaces corresponding to and cooperative with said wedge members whereby a number of said wedge members are actuated to increase said diameter when said actuator means is moved in one direction and a number of other of said wedge members are actuated to decrease said diameter when said actuator means is moved in the other direction, said first-mentioned number of wedge members being longer than said second-mentioned number and pushing said operative segments outwardly when actuated by said actuator means, link means connecting the shorter wedge members with said operating segments, said actuator means passing intermediate said shorter wedge members and their respective linked segments whereby when said shorter wedge members are moved outwardly by said actuator means said operating segments and consequently the follower segments are pulled inwardly by said link means to decrease the diameter of the reel.

10. A tension reel for strip material comprising an axial rotary reel support means, a plurality of peripheral segments mounted thereon for relative outward and inward movement so as to increase and decrease the effective diameter of the reel, means for effecting said relative movement comprising a plurality of wedge members slidably mounted in said support means for outward and inward movement relative to the axis of said support means and actuator means slidably mounted in said support means for reciprocating movement directed along said axis having wedge surfaces corresponding to and cooperative with said wedge members whereby some of said wedge members are actuated to increase said diameter when said actuator means is moved in one direction and other of said wedge members are actuated to decrease said diameter when said actuator means is moved in the other direction, strip clamping means disposed in one of said segments within and adjacent the outer periphery thereof and in clamping relationship with a portion thereof, said strip clamping means comprising a wedge bar member slidably mounted in said one segment for longitudinal reciprocating movement therein with respect to the axis of said support means and having a plurality of wedge faces thereon, a clamping bar member adjacent said wedge bar member having wedge faces thereon corresponding to and cooperative with the wedge faces of said wedge bar member, said clamping bar member being slidably mounted in said one segment for lateral movement only relative to said wedge bar member, said wedge bar and clamping bar members additionally having cooperative key and keyway means therein in slidable wedge-like relationship whereby when said wedge bar member is moved in one direction said clamping bar member is moved to clamping position and when said wedge bar member is moved in the other direction said clamping bar member is moved to unclamping position, said wedge bar member being responsively linked to said actuator means whereby said wedge bar member is moved in one direction and then the other.

11. A tension reel for strip material comprising an axial rotary reel support means, a plurality of peripheral segments mounted thereon for relative outward and inward movement so as to increase and decrease the effective diameter of the reel, said segments being adapted to present a substantially smooth outer peripheral surface in expanded position, said segments comprising at least a pair of operating segments disposed in opposing relationship to each other separated by a pair of follower segments disposed in opposing relationship to each other, said operating and follower segments having cooperating keeper means and keeper receiving means within the outer peripheral surfaces thereof and along their respective adjacent edges in wedge-like relationship whereby as said operating segments are moved inwardly and outwardly with respect to the axis of said support means said follower segments thereby are correspondingly moved with respect to said axis, means for effecting said relative movement, strip clamping means disposed in one of said segments within and adjacent the outer periphery thereof and in clamping relationship with a portion thereof, said strip clamping means comprising a wedge bar member slidably mounted in said one segment for longitudinal reciprocating movement therein with respect to the axis of said support means and having a plurality of wedge faces thereon, a clamping bar member adjacent said wedge bar member having wedge faces thereon corresponding to and cooperative with the wedge faces of said wedge bar member, said clamping bar member being slidably mounted in said one segment for lateral movement only relative to said wedge bar member, said wedge bar and clamping bar members additionally having cooperative key and keyway means therein in slidable wedge-like relationship whereby when said wedge bar member is moved in one direction said clamping bar member is moved to clamping position and when said wedge bar member is moved in the other direction said clamping bar member is moved to unclamping position, said wedge bar member being responsively linked to said means for effecting relative movement of the segments whereby said wedge bar member is moved in one direction and then the other.

12. A tension reel for strip material comprising an axial rotary reel support means, a plurality of peripheral segments mounted thereon for relative outward and inward movement so as to increase and decrease the effective diameter of the reel, said segments being adapted to present a substantially smooth outer peripheral surface in expanded position, said segments comprising at least a pair of operating segments disposed in opposing relationship to each other separated by a pair of follower segments disposed in opposing relationship to each other, said operating and follower segments having cooperating keeper means and keeper receiving means within the outer peripheral surfaces thereof and along their respective adjacent edges in wedge-like relationship whereby as said operating segments are moved inwardly and outwardly with respect to the axis of said support means said follower segments thereby are correspondingly moved with respect to said axis, means for effecting said relative movement comprising a plurality of wedge members engaging said operative segments and being slidably mounted in said support means for inward and outward movement relative to the axis of said support means, actuator means slidably mounted in said support means for reciprocating movement directed along said axis and having wedge surfaces corresponding to and cooperative with said wedge members whereby certain of said wedge members are actuated to increase said diameter when said actuator means is moved in one direction and other of said wedge members are actuated to decrease said diameter when said actuator means is moved in the other direction, strip clamping means disposed in one of said segments within and adjacent the outer periphery thereof and in clamping relationship with a portion thereof, said strip clamping means comprising a wedge bar member slidably mounted in said one segment for longitudinal reciprocal movement therein with respect to the axis of said support means and having a plurality of wedge faces thereon, a clamping bar member adjacent said wedge bar member having wedge faces thereon corresponding to and cooperative with the wedge faces of said wedge bar member, said clamping bar member being slidably mounted in said one segment for lateral movement only relative to said wedge bar member, said wedge bar and clamping bar members additionally having cooperative key and keyway means therein in slidable wedge-like relationship whereby when said wedge bar member is moved in one direction said clamping bar member is moved to clamping position and when said wedge bar member is moved in the other direction said clamping bar member is moved to unclamping position, said wedge bar member being responsively linked to said actuator means whereby said wedge bar member is moved in one direciton and then the other.

(References on following page)

References Cited in the file of this patent

UNITED STATES PATENTS

| | | |
|---|---|---|
| 1,907,896 | Summey | May 9, 1933 |
| 2,056,071 | Moore | Sept. 29, 1936 |
| 2,321,146 | Jones | June 8, 1943 |
| 2,564,482 | Kentis | Aug. 14, 1951 |
| 2,598,398 | Littell et al. | May 27, 1952 |
| 2,909,338 | Cozzo | Oct. 20, 1959 |
| 2,941,745 | Perrine | June 21, 1960 |

FOREIGN PATENTS

| | | |
|---|---|---|
| 873,891 | Great Britain | Aug. 2, 1961 |

UNITED STATES PATENT OFFICE
CERTIFICATE OF CORRECTION

Patent No. 3,128,958                                      April 14, 1964

John C. Bongiovanni et al.

It is hereby certified that error appears in the above numbered patent requiring correction and that the said Letters Patent should read as corrected below.

In the grant, line 3, and in the heading to the printed specification, line 5, for "Washington", each occurrence, read -- Canonsburg --; column 8, line 26, for "actuater" read -- actuator --; line 32, for "fedge" read -- wedge --.

Signed and sealed this 8th day of September 1964.

(SEAL)
Attest:

ERNEST W. SWIDER
Attesting Officer

EDWARD J. BRENNER
                                                                              Commissioner of Patents